US012756491B2

(12) United States Patent
Bowler et al.

(10) Patent No.: US 12,756,491 B2
(45) **Date of Patent: *Oct. 6, 2026**

(54) SYSTEMS AND METHODS FOR SYNCHRONIZING DEVICE CLOCKS

(71) Applicant: Bose Corporation, Framingham, MA (US)

(72) Inventors: Liam Bowler, Waltham, MA (US); Michael W. Elliot, North Grafton, MA (US); Debasmit Banerjee, Everett, MA (US)

(73) Assignee: Bose Corporation, Framington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/868,402

(22) Filed: Jul. 19, 2022

(65) Prior Publication Data

US 2022/0352999 A1 Nov. 3, 2022

Related U.S. Application Data

(63) Continuation of application No. 16/549,710, filed on Aug. 23, 2019, now Pat. No. 11,394,480.

(51) Int. Cl.
*H04J 3/06* (2006.01)
*G06F 1/3209* (2019.01)
*H04L 61/2503* (2022.01)

(52) U.S. Cl.
CPC .......... *H04J 3/0658* (2013.01); *G06F 1/3209* (2013.01); *H04J 3/0679* (2013.01); *H04J 3/0688* (2013.01); *H04L 61/2503* (2013.01)

(58) Field of Classification Search
CPC ...... H04J 3/0658; H04J 3/0679; H04J 3/0688; G06F 1/3209; H04L 61/2503
See application file for complete search history.

(56) References Cited

U.S. PATENT DOCUMENTS 6,147,935 A 11/2000 Guyett
6,560,321 B1 5/2003 Chen
(Continued)

FOREIGN PATENT DOCUMENTS

GB 2536827 A 9/2016
WO 2006074274 A2 7/2006
(Continued)

OTHER PUBLICATIONS

Communication Pursuant to Article 94(3) EPC, European Patent Application No. 20765418.7, dated May 10, 2024, pp. 1-9.
(Continued)

*Primary Examiner* — Pramila Parthasarathy
(74) *Attorney, Agent, or Firm* — Bond, Schoeneck & King, PLLC

(57) ABSTRACT

A media system, method, and a computer program product for synchronizing device clocks including a plurality of devices having device clocks, where each device is capable of independently selecting a primary clock device from the plurality of devices to coordinate clock synchronization of the remaining devices, e.g., secondary devices. Each device can utilize the same criteria or set of rules to select the primary clock device from among the plurality of devices after an initial exchange of data during a discovery phase. The selection of the primary clock device can be based on random or arbitrary selection, or based on at least one devices characteristic exchanged within the data obtained during the discovery phase. Once selected, the primary clock device coordinates a clock synchronization sequence with each secondary device until each secondary device clock is synchronized to within a predetermined threshold with the primary clock of the primary clock device.

20 Claims, 10 Drawing Sheets

(56) References Cited

U.S. PATENT DOCUMENTS

| | | | | |
|---|---|---|---|---|
| 7,873,024 | B1 | 1/2011 | Fenwick | |
| 8,160,045 | B1 * | 4/2012 | Chhabra | H04W 52/0209 370/503 |
| 2004/0259542 | A1 | 12/2004 | Viitamaki | |
| 2008/0031208 | A1 * | 2/2008 | Abhishek | H04W 52/0225 370/338 |
| 2010/0172453 | A1 * | 7/2010 | Cankaya | H04W 56/0015 370/328 |
| 2011/0261842 | A1 | 10/2011 | Beili | |
| 2012/0087503 | A1 | 4/2012 | Watson | |
| 2012/0243871 | A1 * | 9/2012 | Huang | H04B 10/116 398/58 |
| 2012/0263263 | A1 | 10/2012 | Olsen | |
| 2013/0031217 | A1 | 1/2013 | Rajapakse | |
| 2013/0307677 | A1 | 11/2013 | Tarr | |
| 2013/0316642 | A1 | 11/2013 | Newham | |
| 2015/0098576 | A1 * | 4/2015 | Sundaresan | H04L 43/0894 381/58 |
| 2015/0139071 | A1 | 5/2015 | Wu | |
| 2015/0304768 | A1 * | 10/2015 | Prakash | G06F 1/3293 381/59 |
| 2016/0036421 | A1 * | 2/2016 | Bae | H04B 10/116 327/114 |
| 2016/0191584 | A1 * | 6/2016 | Dickow | H04L 65/80 709/219 |
| 2016/0295172 | A1 * | 10/2016 | Cuddeback | H04W 52/02 |
| 2017/0055235 | A1 * | 2/2017 | Rabii | H04N 21/4325 |
| 2018/0006798 | A1 | 1/2018 | Bilstad | |
| 2018/0020309 | A1 | 1/2018 | Banerjee | |
| 2018/0234765 | A1 * | 8/2018 | Torok | H04R 27/00 |
| 2018/0262321 | A1 * | 9/2018 | Yan | H04L 7/0037 |
| 2018/0335903 | A1 | 11/2018 | Coffman | |
| 2020/0099734 | A1 * | 3/2020 | Sun | H04L 12/2874 |
| 2020/0136993 | A1 * | 4/2020 | Yun | H04L 69/323 |

FOREIGN PATENT DOCUMENTS

| | | | |
|---|---|---|---|
| WO | 2017034706 | A1 | 3/2017 |
| WO | 2019083840 | A1 | 5/2019 |

OTHER PUBLICATIONS

International Search Report and the Written Opinion of the International Searching Authority, International Application No. PCT/US2020/047200, dated Nov. 20, 2020, pp. 1-14.

Sheu Jia-Shing et al: "Realization of an Ethernet-based synchronous audio playback system", Multimedia Tools and Applications, Kluwer Academic Publishers, Boston, US, vol. 75, No. 16, Oct. 12, 2015 (Oct. 12, 2015), pp. 9797-9818, XP036037306, ISSN: 1380-7501, DOI: 10.1007/S11042-015-2983-9.

* cited by examiner

SYSTEMS AND METHODS FOR SYNCHRONIZING DEVICE CLOCKS

RELATED APPLICATIONS

This application is a continuation of U.S. patent application Ser. No. 16/549,710, filed Aug. 23, 2019, the entire contents of which are hereby incorporated by reference.

BACKGROUND

This disclosure generally relates to media systems and methods, in particular, systems and methods for synchronizing device clocks of media devices.

Multi-device media systems, as well as left/right audio device pairs utilize internal clocks when communicating. Time stamp information is exchanged by the devices within a media system so that, e.g., audio may be generated by each device within a given tolerance and/or audio-video synchronization is within a given tolerance. Ideally, the tolerance between devices is small enough to not be noticeable by a user within the established zone or space the devices are arranged within. The tolerance may be larger for multi-room systems as a user may not be able to, e.g., perceive an audible difference between rooms as well as between two audio devices within the same room. Upon initial set up of such systems, the time necessary to synchronize a first device with a second can take on the order of seconds to tens of seconds depending on the accuracy needed, for example, it takes more time to form and synchronize a group of left/right stereo devices within a single room than the time required to form and synchronize multi-room audio system. This increased time leads to degradation of the end user's enjoyment due to increased time until media is produced by the system, as well as inhibits other potential end user features, such as seamlessly moving audio from one location to another or moving audio between pre-established groups.

Additionally, due to the lack of precision of the internal clocks in electronic media devices, the devices within a predefined group may need to be periodically resynchronized to maintain accurate data transfer and media generation within the required tolerances.

Furthermore, conventional systems also allow devices to revert to a dozed state, e.g., a power-saving state, when not actively generating audio output. Within this dozed state, conventional systems are unable to transfer the amount of data necessary to resynchronized device clocks within the system.

SUMMARY OF THE DISCLOSURE

The present disclosure is directed to improved systems and methods for synchronizing clock devices of a media system within a network. The media system can include a plurality of devices having device clocks, where each device is capable of independently selecting a primary clock device from the plurality of devices to coordinate clock synchronization of the remaining devices, e.g., secondary devices. Each device utilizes the same algorithmic rules to select the primary clock device from among the plurality of devices after an initial exchange of data during a discovery phase. The algorithmic criteria for selection of the primary clock device can be based on random or arbitrary selection, or based on at least one devices characteristic exchanged within the data obtained during the discovery phase. Once selected it is the responsibility of the primary clock device to exit a power-saving state periodically, and coordinate a clock synchronization sequence with each secondary device until each secondary device clock is synchronized to within a predetermined threshold with the primary clock of the primary clock device. Additionally, similar criteria can be applied to the selection of a primary health device to maintain the "health" of the media system and the selection of a primary media distribution device responsible for sending, receiving, or otherwise distributing media content and data to each device.

In an example, there is provided a method for synchronizing device clocks including: discovering, over a network, a plurality of devices within a media system; determining a primary clock device of the plurality of devices, the primary clock device having a primary clock; sending a clock synchronization request from the primary clock device to a secondary device of the plurality of devices, regardless of whether media content is being rendered by any of the plurality of devices; and, initiating a clock synchronization sequence wherein the clock synchronization sequence is arranged to synchronize a secondary clock of the secondary device with the primary clock of the primary clock device.

In an aspect, each device of the plurality of devices includes at least one device characteristic is selected from: an internet protocol (IP) address, a network reliability metric, or a device power type.

In an aspect, determining the primary clock device includes: selecting the primary clock device from the plurality of devices, wherein the primary clock device has a lowest IP address of the plurality of devices; selecting the primary clock device from the plurality of devices based at least in part on the network reliability metric of each device of the plurality of devices; or selecting the primary clock device from the plurality of devices, wherein the primary clock device has a wall-powered device power type.

In an aspect, the method further includes: initiating an initial clock synchronization sequence between the primary clock device and each at least one secondary device, wherein the initial clock synchronization sequence is arranged to synchronize the secondary clock of the secondary device with the primary clock; entering, with the primary clock device and the secondary device a power saving state; and, exiting, with the primary clock device the power-saving state at a predetermined time interval; exiting, with the secondary device, the power saving state upon receipt of the clock synchronization request from the primary clock device.

In an aspect, the clock synchronization sequence is arranged to synchronize the secondary clock of the secondary device with the primary clock over a first time duration.

In an aspect, the first time duration is dynamic.

In an aspect, the method further includes: receiving, at the primary clock device, a confirmation that the secondary clock and the primary clock have entered a synchronous state.

In an aspect, the method further includes: determining, at a predefined time intervals, if the primary clock device is connected to the network.

In an aspect, if the primary clock device is not connected to the network, the method further includes: determining a new primary clock device from the plurality of devices connected to the network where each device of the plurality of devices shares a clock domain identifier.

In an example, a computer program product is provided, the computer program product stored on a computer readable medium which includes a set of non-transitory computer readable instructions for synchronizing device clocks that when executed on a processor is arranged to: discover, over a network, a plurality of devices within a media system; determine a primary clock device of the plurality of devices, the primary clock device having a primary clock; send a clock synchronization request from the primary clock device to a secondary device of the plurality of devices, regardless of whether media content is being rendered by any of the plurality of devices; and, initiate a clock synchronization sequence wherein the clock synchronization sequence is arranged to synchronize a secondary clock of the secondary device with the primary clock of the primary clock device.

In an aspect, each device of the plurality of devices includes at least one device characteristic selected from: an internet protocol (IP) address, a network reliability metric, or a device power type.

In an aspect, determining the primary clock device the set of non-transitory readable instructions are arranged to: select the primary clock device from the plurality of devices, wherein the primary clock device has a lowest IP address of the plurality of devices; select the primary clock device from the plurality of devices based at least in part on the network reliability metric of each device of the plurality of devices; or select the primary clock device from the plurality of devices, wherein the primary clock device has a wall-powered device power type.

In an aspect, the set of non-transitory readable instructions is further arranged to: initiate an initial clock synchronization sequence between the primary clock device and the secondary device, wherein the initial clock synchronization sequence is arranged to synchronize the secondary clock of the secondary device with the primary clock of the primary clock device; enter, with the primary clock device and the secondary device a power saving state; exit, with the primary clock device the power-saving state at a predetermined time interval; and, exit, with the secondary device, the power saving state upon receipt of the clock synchronization request from the primary clock device.

In an aspect, the clock synchronization sequence is arranged to synchronize the secondary clock of the secondary device with the primary clock of the primary clock device over a first time duration.

In an aspect, the set of non-transitory computer readable instructions are further arranged to: receive, at the primary clock device, a confirmation that the secondary clock and the primary clock have entered a synchronous state; and, determine, at predefined time intervals, if the primary clock device is connected to the network.

In an aspect, if the primary clock device is not connected to the network, the set of non-transitory computer readable instructions are further arranged to: determine a new primary clock device from the plurality of devices connected to the network where each device of the plurality of devices shares a clock domain identifier.

In an example, there is provided a system for synchronizing device clocks the system including: a plurality of devices connected to a network, the plurality of devices including: a primary clock device having a primary clock; and, a secondary device having a secondary clock, the secondary device arranged to receive a clock synchronization request from the primary clock device; wherein the primary clock device and the secondary device are arranged to enter a clock synchronization sequence, regardless of whether media content is being rendered by any of the plurality of devices, wherein the clock synchronization sequence is arranged to synchronize the secondary clock of the secondary device with the primary clock of the primary clock device.

In an aspect, each device of the plurality of devices includes at least one device characteristic selected from: an internet protocol (IP) address, network reliability metric, or a device power type.

In an aspect, selecting the primary clock device includes: selecting the primary clock device from the plurality of devices, wherein the primary clock device has a lowest IP address of the plurality of devices; selecting the primary clock device from the plurality of devices based at least in part on the network reliability metric of each device of the plurality of devices; or selecting the primary clock device from the plurality of devices, wherein the primary clock device has a wall-powered device power type.

In an aspect, if the primary clock device is no longer connected to the network, the system selects a new primary clock device from the plurality of devices connected to the network where each device of the plurality of devices shares a clock domain identifier.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION

Figure 1:
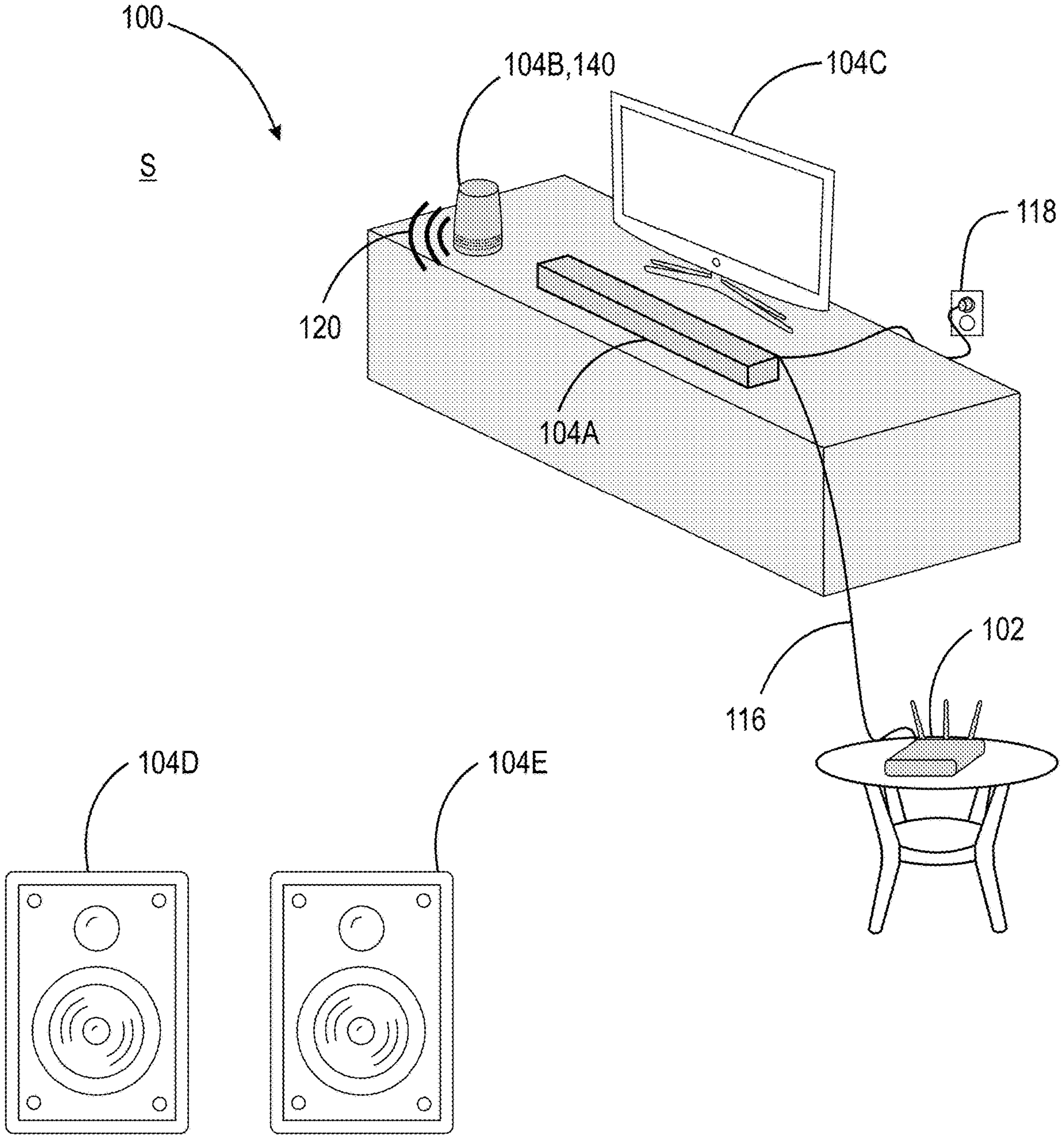
FIG. 1 is a schematic perspective view of a media system within a space according to the present disclosure.

The present disclosure is directed to improved systems and methods for synchronizing clock devices of a media system within a network. The media system can include a plurality of devices having device clocks, where each device is capable of independently selecting a primary clock device from the plurality of devices to coordinate clock synchronization of the remaining devices, e.g., secondary devices. Each device utilizes the same algorithmic rules to select the primary clock device from among the plurality of devices after an initial exchange of data during a discovery phase. The algorithmic criteria for selection of the primary clock device can be based on random or arbitrary selection, or based on at least one devices characteristic exchanged within the data obtained during the discovery phase. Once selected it is the responsibility of the primary clock device to exit a power-saving state periodically, and coordinate a clock synchronization sequence with each secondary device until each secondary device clock is synchronized to within a predetermined threshold with the primary clock of the primary clock device. Additionally, similar criteria can be applied to the selection of a primary health device to maintain the "health" of the media system and the selection of a primary media distribution device responsible for sending, receiving, or otherwise distributing media content and data to each device.

The techniques and systems described herein provide numerous benefits. For example, the proposed techniques result in a situation where the clocks of all of the devices of the media system (e.g., all media devices on a user's LAN/WLAN) are synchronized at all times (or at least are intended to be synchronized, which could take multiple iterations of the synchronization techniques described herein to achieve). Such a sustained or persistent synchronization, where the synchronization is within an acceptable tolerance (e.g., within 1-30 milliseconds (ms)) results in decreased media device zone/group/pair creation time and thus decreased time to media rendering (e.g., audio playback). In addition, the techniques and systems described herein enables permanent media device zone/group/pair creation, stable multiroom media in the case of device drop offs due to various issues (e.g., power loss), and other experience-enhancing features, such as seamlessly moving media from one device to another without interruption in media playback and enhanced forming of media device zones/groups/pairs via various control techniques (e.g., voice or virtual personal assistant (VPA)-based techniques, in-app based techniques, and from-device based techniques). Other benefits will be apparent in light of this disclosure. Note that in some implementations, the media system is an audio-only system (e.g., including two or more speakers) that manages synchronization for only audio data, while in other implementations the media system is a video-only system (e.g., including two or more displays) that manages synchronization for only video data, while in still other implementations the media system manages synchronization for audio and video data.

Use of the techniques and systems described herein can be detected in numerous ways. For example, use of the techniques and systems can be detected based on low time to media render for high accuracy playback between media devices that have not been previously combined in a zone/group/pair, such as for stereo-paired speakers which have not previously been paired together or for surround-sound systems that had not been previously grouped. Detection can also be based on low time to media for high accuracy playback between media devices that have not rendered audio since being power cycled. Detection can also be based on analysis of network traffic during times where media devices appear to be in a low-power (or dozed) state or not actively rendering media content, as the techniques described herein operate to synchronize devices even in such states, in at least some implementations. Detection via network traffic analysis is more robust when a system (e.g., media devices on a user's LAN/WLAN) contain three or more devices, because the periodic network traffic would be centralized to a single device—the primary clock device—which provides the reference clock for the system. Other ways of detecting use of the techniques and systems described herein will be apparent in light of this disclosure.

Figure 2:
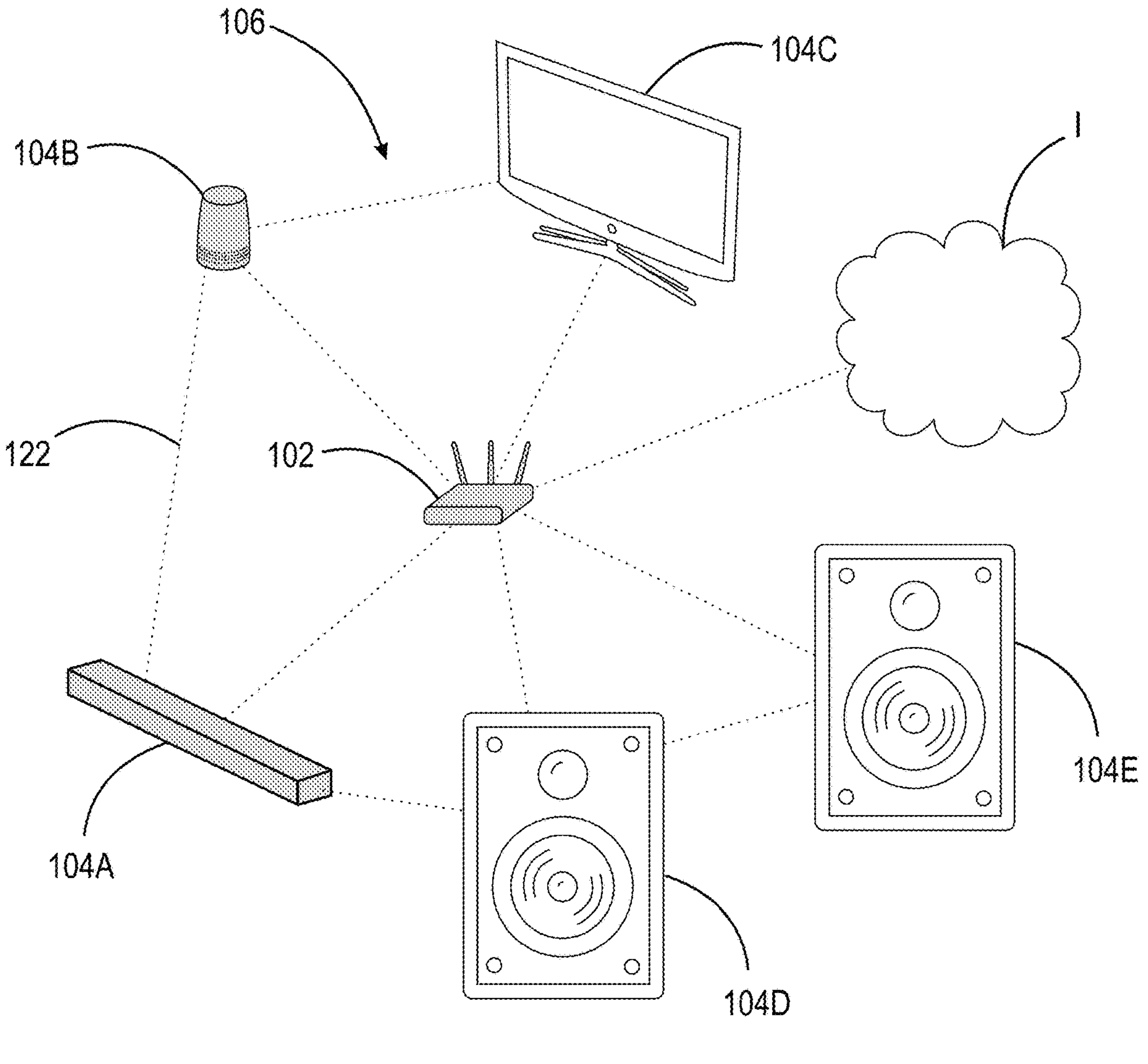
FIG. 2 is a schematic view of a network of devices according to the present disclosure.

Turning now to the figures, FIG. 1 is a perspective schematic view of a space S within which a media system 100 is provided. Media system 100 includes a router 102 arranged to connect a plurality of devices 104A-104E to a network 106 within space S. Router 102 is intended to be a network router capable of receiving and forwarding data packets within a network or networks 106. Additionally, router 102 includes a Dynamic Host Configuration Protocol (DHCP) server or service capable of automatically providing and assigning local internet profile (IP) addresses to each device, e.g., devices 104A-104E, within the network 106 or networks 106. Plurality of devices 104A-104E are intended to include any device capable of sending and receiving data packets containing media data, for example, data related to audio, video, and/or image applications and can include but are not limited to: televisions, smart televisions, wearable audio devices (such as headphones, earbuds, or smart glasses), sound bars, stand-alone speakers, speaker systems, smart hubs, personal computers, portable personal computers, smart phones, and tablets. Additionally, each device of plurality of devices 104A-104E is capable of entering and exiting a power-saving state 138 (discussed below) and entering and exiting an operating state 140 (discussed below). In one example, as illustrated in FIGS. 1 and 2, device 104A is a sound bar, device 104B is a portable wireless speaker, device 104C is a smart TV, and devices 104D and 104E are left and right speakers, respectively. Note that five devices are used in FIG. 1 for illustrative purposes only, as the techniques described herein can be used with as few as two devices and up to an unlimited number of devices. Therefore, "plurality of devices" as used herein includes "at least two devices" or "two or more devices" or "multiple devices". Network 106 is intended to be a local area network (LAN) or a Wireless Local Area Network (WLAN) intended to connect, via wired connections, wireless connections, or a combination of wired or wireless connections, the plurality of devices 104A-104E to router 102 and/or to each other within network 106. However, it should be appreciated that network or networks 106 are not limited to local networks, for example, networks 106 can include servers, other devices, and routers outside of the local network and can be connected to the internet I (as shown in FIG. 2). Space S is intended to be a room or a plurality of rooms within range of the LAN or WLAN network 106.

Figure 4:
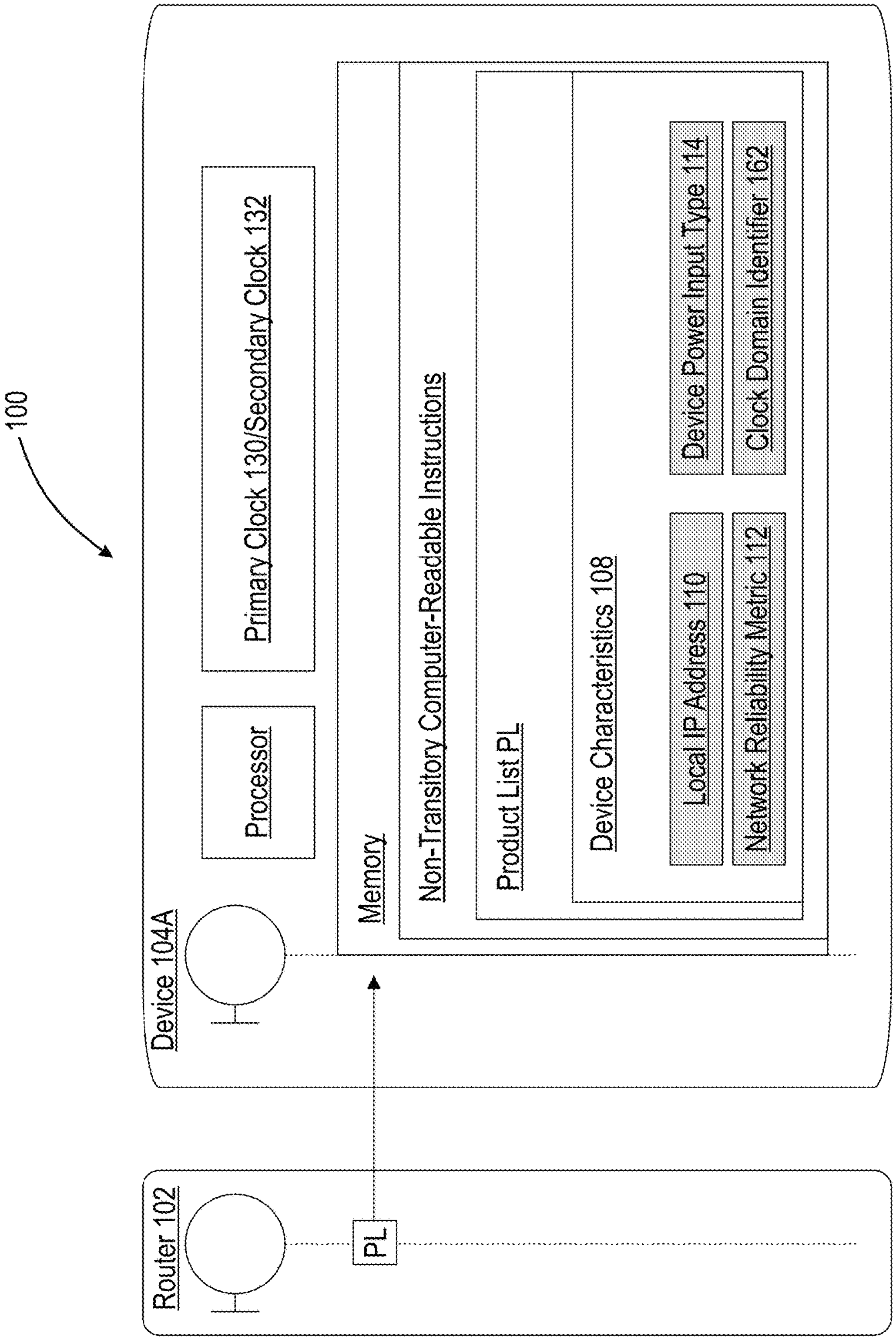
FIG. 4 is a schematic view of a device according to the present disclosure.

Each device of plurality of devices 104A-104E includes at least one device characteristic 108 (shown schematically in FIG. 4). Device characteristic 108 can be selected from at least one of: a local IP address 110 (assigned by, for example, the DCHP server/service of router 102), a network reliability metric 112, a device power input type 114, or a clock domain identifier 162 (discussed below). The network reliability metric 112 can include information related to an upload speed of a particular connection, a download speed of a particular connection, the Received Signal Strength Indicator (RSSI) corresponding to a particular connection, the connection type, operating physical rate, or packet error/loss rate. The connection type could include, e.g., whether the connection type utilizes an operating frequency of 2.4 GHz or 5.0 GHz, or whether the connection type uses a data cable (i.e., data cable 116) to transfer data, for example, where data cable 116 is an Ethernet cable. In such an example situation, an ethernet-cable connection type would be preferred over a 5.0 GHz connection type, and both of those connection types would be preferred over a 2.4 GHz connection type, thereby establishing a connection type hierarchy. The packet loss rate and consistency of operating physical rate of the link can be used to determine scalability and/or accuracy of the synchronization (e.g., to determine how many media devices can be included in a given synchronized system). The device power input type 114 can include information as to whether a particular device utilizes a battery, capacitor, super capacitor, or a standard alternating current (AC) or direct current (DC) power input, e.g., from a connection to a wall outlet power source 118 as shown in FIG. 1. Additionally, each device of plurality of devices 104A-104E can include the ability to produce sound, i.e., an audio playback 120. Audio playback 120 may correspond to data related to music, voice, or audio associated with digital or analog media, and may be produced by a transducer or other equivalent speaker components known in the art. Note that although the plurality of devices 104A-104E are primarily described herein in the context of being audio devices or at least being capable of audio playback, the techniques also apply to synchronization for video and/or image data. Therefore, each of the plurality of devices 104A-104E could include at least one of audio playback capabilities, video playback capabilities, or image display capabilities, and the techniques described herein are not intended to be limited to cover clock synchronization for only one of audio, video, or images unless otherwise explicitly stated.

As illustrated schematically in FIG. 2, network 106 includes plurality of devices 104A-104E connected via router 102. Each device of plurality of devices 104A-104E is arranged to communicate with router 102 and/or arranged to communicate with each other. It should be appreciated that each device can be arranged to communicate with the other devices of plurality of device 104A-104E via router 102 or directly with each other using at least one communication protocol 122. Communication protocol 122 can be selected from: WiFi (IEEE 802.11 a/b/g/n/ac/e), Bluetooth Classic, Bluetooth Low-Energy (BLE), Radio Frequency Identification (RFID), ZigBee, Z-Wave, 6LoWPAN, Thread, WiFi-ah, 2G, 3G, 4G, 5G, LTE Cat 0, LTE Cat 1, LTE Cat 3, Near Field Communications (NFC), Simple Service Discovery Protocol (SSDP), Zero-configuration networking tools or protocols (zeroconf), or any other wired or wireless protocol capable of sending and receiving data between each device of plurality of devices 104A-104E and/or router 102.

Figure 3:
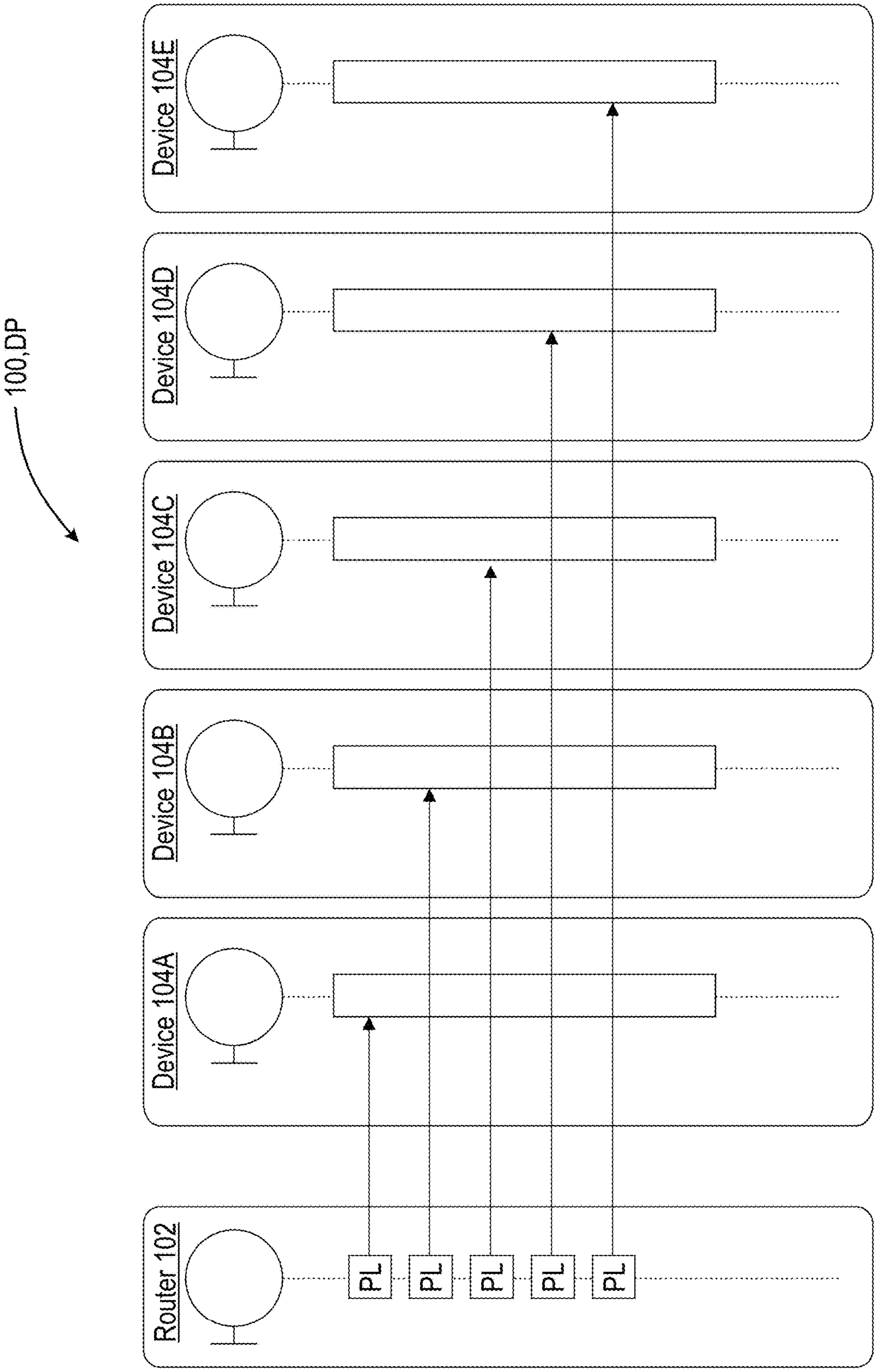
FIG. 3 is a schematic view of a media system during a discovery phase according to the present disclosure.

It should be appreciated that within network 106, each device can send and/or receive data or information relating to each device of plurality of devices 104A-104E, for example, data or information relating to each device's device characteristics 108, and store each device's device characteristics 108 in an internal memory of each device (discussed below and illustrated in FIG. 4). It should be appreciated that this discovery phase DP can utilize a different protocol to send and/or receive device information and device characteristics 108 than is used to stream, send, or receive media data to generate an audio playback 120 (discussed below), for example, the discovery phase DP could utilize SSDP protocols or zeroconf tools to discover the devices within network 106 and exchange device characteristics 108 between each device of plurality of devices 104A-104E. During the discovery phase DP, as illustrated in FIG. 3, the router 102 or the network server sends and receives device information via communication protocol 122 to update a product list PL stored in the memory of each device of the plurality of devices 104A-104E. As illustrated in FIG. 4, during discovery phase DP, each device can store within memory device characteristics 108 of each device of plurality of devices 104A-104E. Although FIG. 4 only illustrates example components of device 104A, it should be appreciated that each device of plurality of devices 104A-104E contain substantially similar components.

Figure 5:
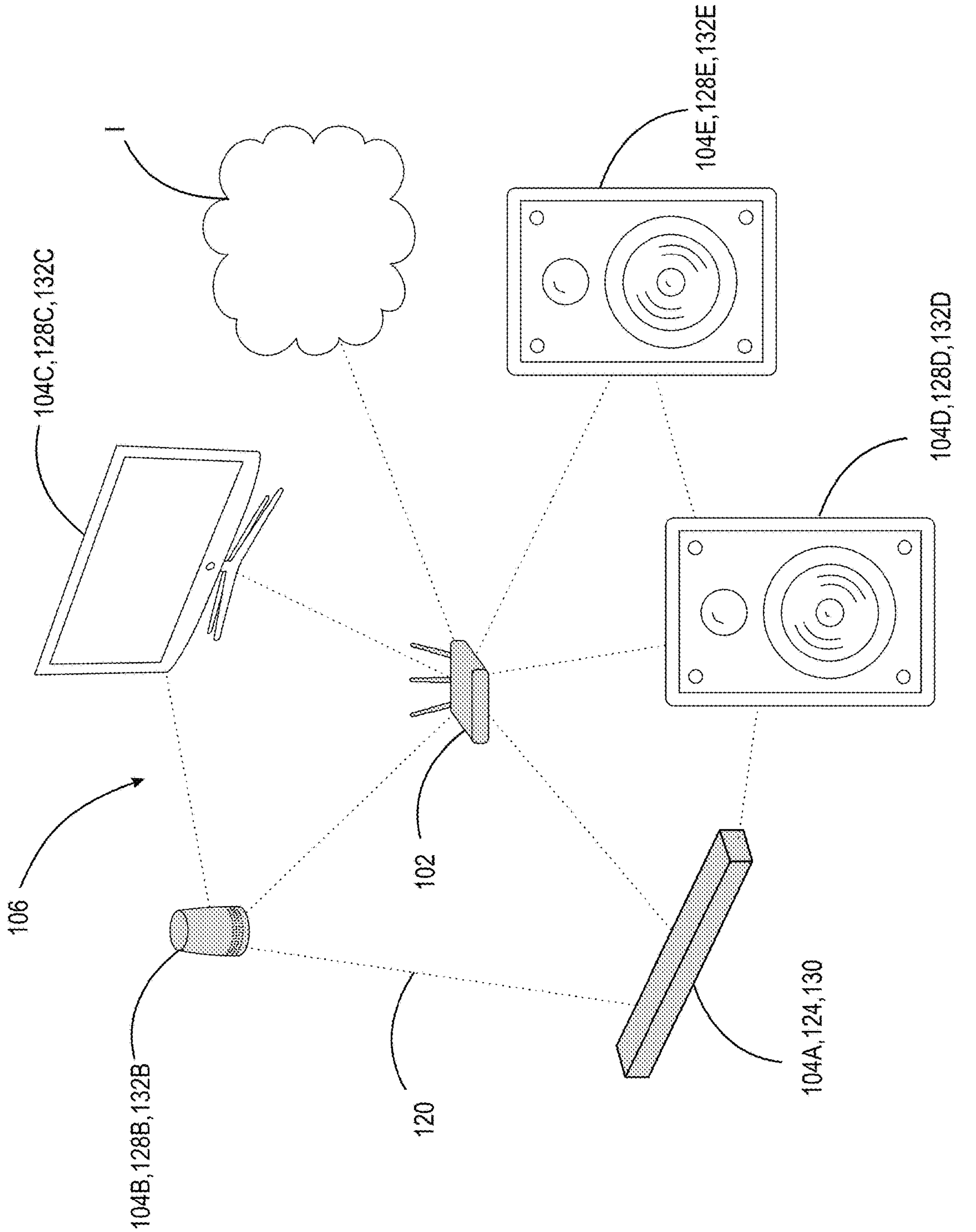
FIG. 5 is a schematic view of a network of devices according to the present disclosure.

Additionally, in one example, it is desirable to synchronize device clocks so that established left/right pairs of speakers, multi-room speaker configurations, or multi-device speaker configurations can broadcast, generate, or otherwise produce audio playback 120 within an acceptable tolerance such that a user listening to the audio playback 120 cannot distinguish between audio playback 120 produced by each speaker within a space S. To accomplish this synchronization, a primary device can be selected from the plurality of devices 104A-104E. As illustrated in FIG. 5, in one example, the primary device is selected as a primary clock device 124, e.g., a device responsible for initiating clock synchronization sequences 144 (discussed below) and sending and receiving clock synchronization requests 146 (discussed below) and acknowledgements 148 (discussed below) between each device of plurality of device 104A-104E. Furthermore, once a primary clock device 124 is selected from the plurality of devices 104A-104E, the remaining devices become secondary devices 128A-128E. For example, if device 104A is selected as the primary clock device 124, the remaining devices 104B-104E become secondary devices 128B-128E.

In the foregoing example, each device 104A-104E includes an internal device clock capable of keeping independent time. This can be accomplished through various circuit components, for example, through the use of a crystal quartz resonator within each device of the plurality of devices 104A-104E. Once a primary clock device 124 is selected from the plurality of devices 104A-104E, the primary clock device 124's clock becomes the primary clock 130 for media system 100. Moreover, once the primary clock device 124 is selected and the primary clock 130 has been established, each secondary device 128A-128E includes a secondary clock 132A-132E. Therefore, given the example discussed above, primary clock device 124 is device 104A having a primary clock 130, while the remaining devices 104B-104E become secondary devices 128B-128E having secondary clocks 132B-132E, respectively.

To aid in selection of the primary clock device 124, each device of plurality of devices 104A-104E within network 106 is arranged to store and execute, on a respective memory and processor of each device, a set of non-transitory computer readable instructions related to an algorithm for selecting the primary clock device 124 or a primary media distribution device 126 (discussed below). The algorithm, executable on each device of plurality of devices 104A-104E, can utilize the same rule or instruction set to select the primary clock device 124. For example, the algorithm can be arranged to receive data relating the device characteristics 108 of each device of plurality of devices 104A-104E and determine or select the primary clock device 124 based on at least one device characteristic 108 of the devices of the plurality of devices 104A-104E that have been stored in the memory of each device connected within network 106. In one example, the algorithm, executable on each device of plurality of devices 104A-104E, is configured to indicate that the primary clock device 124 should be the device with the lowest local IP address. In this way, each device of plurality of devices 104A-104E will know which device of the plurality is the primary clock device for the purpose of clock synchronization (discussed below). Alternatively, the algorithm can select the primary clock device 124 from the plurality of devices 104A-104E randomly or arbitrarily. Additionally, the set of non-transitory computer-readable instructions can relate to or contain instructions dedicated to separate software services, for example, each device of plurality of devices 104A-104E can have a dedicated service for power management, i.e., a power service 134 (shown in FIG. 6), and can have a dedicated service for maintaining and synchronizing clocks, i.e., a clock synchronization service 136 (shown in FIG. 6) as will be discussed below. In some implementations, the algorithm for selecting the primary clock device 124 is stored and/or executed on only one of devices 104A-104E, and the primary clock device selection information is then received by the other devices (e.g., directly from the only one of the devices making the selection or from another source). In some implementations, the algorithm for selecting the primary clock device 124 is stored and/or executed at a location that is separate from devices 104A-104E, such as at a controller that interfaces with one or more of devices 104A-104E and/or in the cloud (e.g., via internet connection I shown in FIG. 2 or via an internet connection of a connected controller, such as a smartphone or tablet).

As described above and illustrated in FIG. 6, each device of plurality of device 104A-104E can enter or exit a power-saving state 138 throughout normal operation of media system 100. The entry into or exit from power-saving state 138 to operation state 140 and vice-versa is managed by each device's power service 134. For example, after ten (10) minutes without producing audio playback 120, the power service 134 of device 104A can cause device 104A to enter power-saving state 138. Within power-saving state 138, device 104A can still send or receive data; however, the rate at which device 104A sends or receives data while in the power-saving state 138 is diminished. Additionally, all of the remaining devices of the plurality of devices similarly enter a power-saving state 138 after a set duration of inactivity. However, as mentioned above, even in the power-saving state 138 it is desirable to have the clocks of each device synchronized, or at least synchronized within a certain margin of error, such that when each device exits the power-saving state 138 and enters an operational state 140 the devices are already synchronized and can proceed directly into normal operation to, for example, produce audio playback 120.

Figure 6:
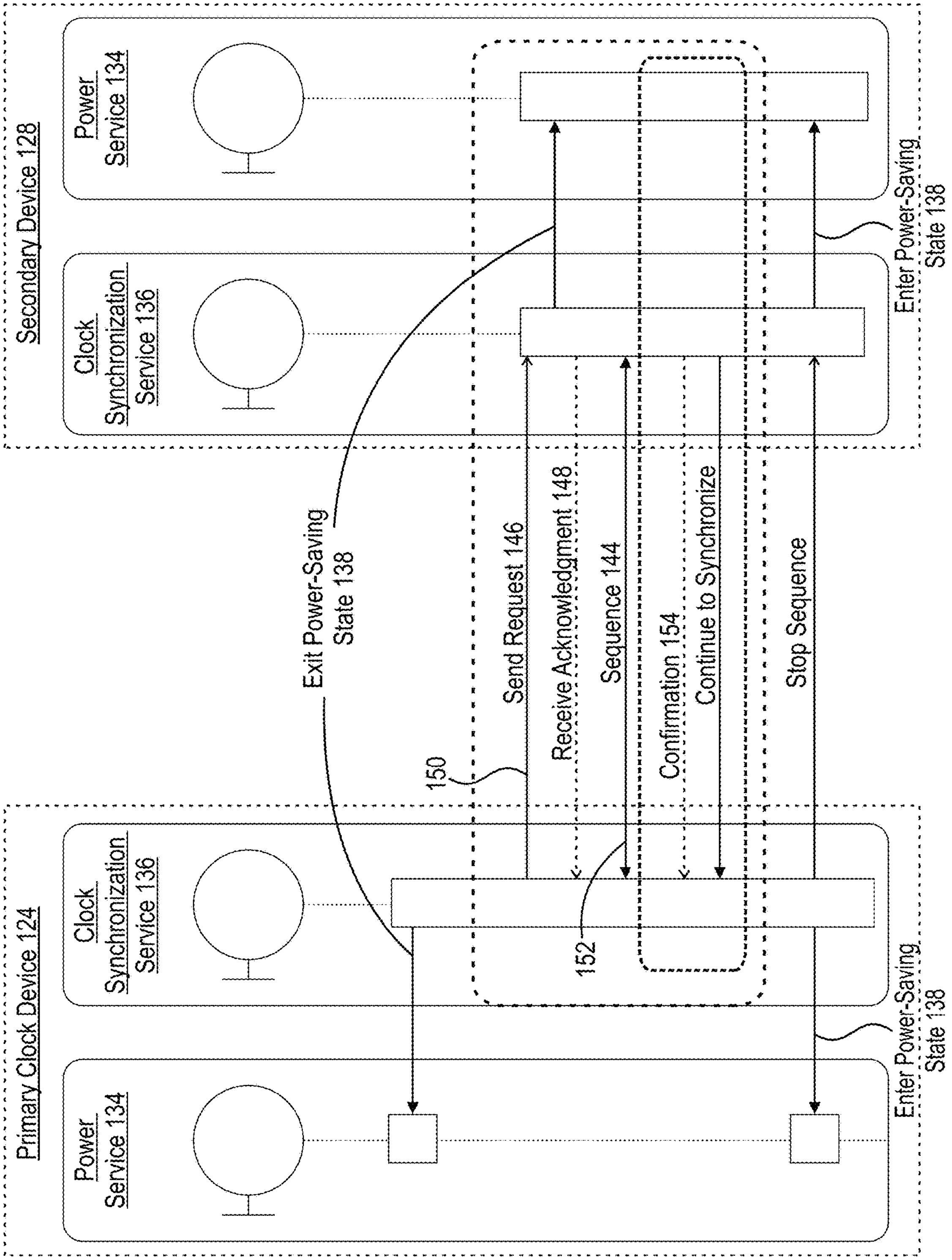
FIG. 6 is a schematic view of a synchronization process according to the present disclosure.

In one example, primary clock device 124, once selected, has the responsibility of independently exiting power-saving state 138 and entering the operating state 140, at a predetermined time interval 142, and while in the operating state 140 coordinating a clock synchronization sequence 144 with each secondary device of the plurality of devices 104A-104E. In one non-limiting example, the predetermined time interval 142 is on the order of 5 minutes. However, it should be appreciated that this predetermined time interval can be any time interval greater than 0 seconds, such as every 1, 2, 3, 4, 8, 10, 12, 15, 20, 25, or 30 minutes, to provide some additional examples. In some implementations, the predetermined time interval is not constant and changes based on one or more variables, such as information received from synchronization sequence 144 (e.g., how long it takes for the one or more secondary devices to become synchronized). As illustrated in FIG. 6, coordination of the clock synchronization process is managed by the clock synchronization service 136 and can include: sending a clock synchronization request 146 from the primary clock device 124 to a secondary device 128A-128E, initiating an exit of the secondary device 128A-128E from a power saving state 138 if the secondary device 128A-128E is in a power-saving state 138 upon receipt of the clock synchronization request 146, receiving an acknowledgement 148 from the secondary device 128A-128E that the clock synchronization request 146 was received by the secondary device 128A-128E, and upon receipt of the acknowledgement 148 by the primary clock device 124, entering the clock synchronization sequence 144. The clock synchronization sequence 144 can utilize a clock synchronization protocol 150 selected from: a Clock-sampling mutual network synchronization protocol (CS-MNS), a Network Time Protocol (NTP), a Precision Time Protocol (PTP), a Reference Broadcast Time Synchronization protocol (RBS), Synchronous Ethernet protocol, Data-Plane Time-Synchronization Protocol (DPTP) or any other protocol capable of sending, receiving and synchronizing two device clocks over a wired or wireless connection.

Once initiated, the clock synchronization sequence 144 will run for a predetermined duration of time, i.e., a first time duration 152. First time duration 152, can be, for example, 30 seconds to prevent significant power drain in the event that the primary clock device 124 is powered by a battery, capacitor, or super-capacitor as discussed above; however, it should be appreciated that any time interval can be selected, such as 10, 20, 40, or 50 seconds, or 1, 2, or 3 minutes. After the first time duration 152, the secondary device 128A-128E can run a check to determine if the primary clock 130 and the secondary clock 132 match within a predefined threshold, e.g., within a range of plus or minus 10 milliseconds. It should be appreciated that the predefined threshold can be selected based on the particular application of plurality of devices 104A-104E. In one example, the primary clock 130 and secondary clock 132 are positioned within a left/right stereo pair of audio devices. In this example, as the devices of a left/right stereo pair are typically in close proximity to each other, the predefined threshold that the device clocks must maintain is over a smaller or narrower range of plus/minus values, for example, within a range of plus or minus 100 microseconds, e.g., 10 microseconds, 20 microseconds, 50 microseconds, etc. In another example, the primary clock 130 and secondary clock 132 are a part of a multi-room system of audio devices. In this example, as the devices of multi-room system are typically not in close proximity to each other, the predefined threshold that the device clocks must maintain is over a larger or broader range of plus/minus values, for example, within a range of plus or minus 10 milliseconds, e.g., 1 millisecond, 2 milliseconds, 5 milliseconds, etc. If the two clocks are within this predefined threshold, the secondary clock sends a confirmation 154 to the primary clock device 124 that the primary clock 130 and the secondary clock 132 have entered a synchronized state 156, for example, a state where the primary clock and the secondary clock 132 are within the predefined threshold. If the check resolves in the negative, e.g., the two clocks are not within the predefined threshold, the secondary clock sends a negative confirmation that the two clocks are not in a synchronized state 156 and the primary clock device 124 can reinitiate the clock synchronization sequence 144 with the secondary device 128A-128E. This process continues until the confirmation 154 that the two clocks are in a synchronized state 156 or continues for a predetermined number of cycles, e.g., three cycles, and then terminate regardless of whether the two clocks are in the synchronous state 156. Additionally, it should be appreciated that first time duration 152 can be dynamic. In other words, if the primary and secondary clocks continuously fall into a synchronous state after 10 seconds of synchronization sequence 144, first time duration can be limited in future synchronizations to 10-15 seconds to promote efficient power use. Furthermore, the primary clock device 124 can simultaneously or sequentially perform this synchronization process with every secondary device connected to network 106 and/or any device discovered during the discovery phase DP discussed above. Once each secondary device has participated in the clock synchronization process discussed above, each secondary device can optionally reenter power-saving state 138 or continue within the operational state 140, and once all of the discovered devices connected to the network 106 have participated in the synchronization process, the primary clock device 124 can optionally reenter the power-saving state 138.

Figure 7:
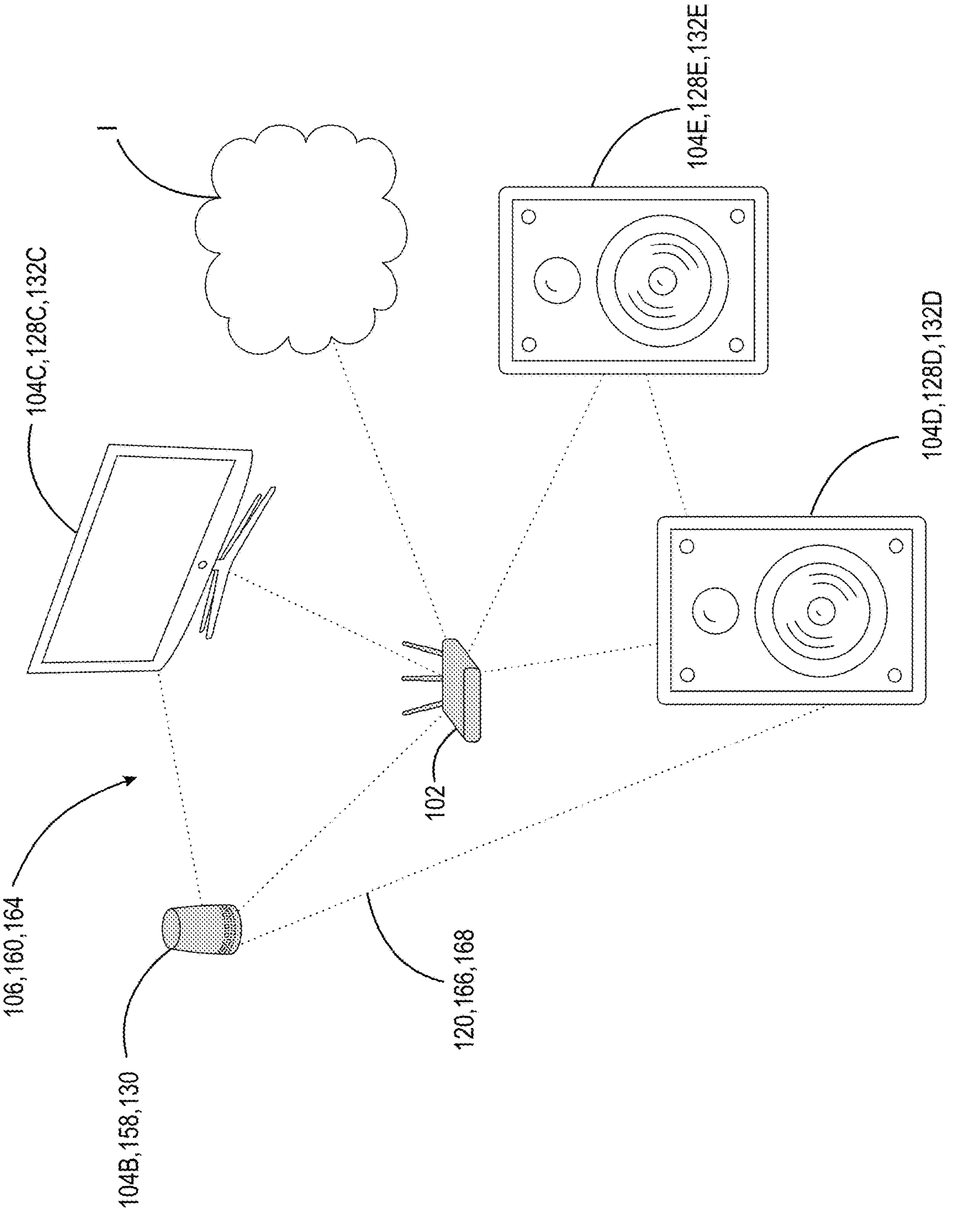
FIG. 7 is a schematic view of a device according to the present disclosure.

Additionally, periodically it may be necessary and/or desirable to check whether the selected primary clock device 124 is still connected to the network 106. To further the above example, where device 104A is selected as the primary clock device 124, it is possible that during the operation of media system 100, device 104A is disconnected from network 106. This could happen as a result of, for example, device 104A running out of power in the event device 104A is battery powered, or some other form of interference with the data communication to device 104A. If a disconnection occurs, it would be desirable to promote another device from the plurality of devices 104A-104E as a new primary clock device 158 as each device of the plurality of devices 104A-104E is presumably operating on the same clock domain 160, e.g., all running clocks that are synchronized with each other, or at least synchronized with each other within a predetermined threshold. The selection of a new primary clock device 124 from the plurality of devices 104B-104E in the event device 104A is disconnected from network 106 is illustrated in FIG. 7. To aid in the selection of a new primary clock device 158, each device of the plurality of devices 104B-104E utilizes a clock domain identifier 162 (illustrated in FIG. 4), which is included in each device's device characteristics 108 as discussed above. As each device of plurality of devices 104A-104E within the same clock domain 160 already have each device's device characteristics 108 stored in their respective memories, the algorithm, executable independently on each device, can simply automatically select the next best device from within the clock domain 160 that meets the same rule or instruction set as originally used to select the primary clock device 124 to select the new primary clock device 158 from the remaining devices of the plurality of devices 104A-104E. Importantly, the process of synchronizing clocks, as discussed above, is not affected by the operational states of any of the devices or the rendering of content, i.e., media data and/or audio playback 120. In other words, some or all of the devices of plurality of devices 104A-104E, prior to, during, and/or after the synchronization process discussed herein, can continue to send and receive media data, produce audio playback 120, and/or otherwise render audio data regardless of and unimpeded by the synchronization process.

Given the foregoing, in addition to selecting a primary clock device, i.e., primary clock device 124, it should be appreciated that media system 100 can utilize similar selection techniques and rules to select a primary health device 125 (not shown) and a primary media distribution device 126 (not shown). The primary health device 125, once selected, is responsible for sending and receiving requests and acknowledgments from every device of the plurality of devices 104A-104E to ensure proper "health" (e.g., responsiveness and/or level of operation) of each device, for example, the primary health device periodically, i.e., at a predefined time interval 143 (not shown), sends request signals to check that each device established in its product list PL, obtained in the discovery phase DP discussed above, is still responsive and ensure that each device's respective device characteristics 108 have not changed in a way that could affect the media system's performance. If something has changed, the primary health device 125 can send corresponding instructions to each device of plurality of devices 104A-104E requesting that each device reenter the discovery phase DP and update their product lists PL. It should be appreciated that the algorithmic criteria for selection of the primary health device could be the same algorithmic criteria used to select primary clock device 124, and therefore, the primary clock device 124 and the primary health device 126 can be embodied by the same device. In one example, the primary health device 125 is a separate device from the primary clock device 124. In this example, the primary health device 125 can periodically obtain information from the devices within network 106. If any of the devices fail to respond to the requests of the primary health device 125, for example, if they disconnect from the network 106, primary health device 125 is arranged to indicate to each device that they reenter the discovery phase DP and update their respective product lists PL. Importantly, the primary health device 125 indicates to the network 106 that the primary clock device 124 is no longer connected to the network and that a new primary clock device 158 should be selected as discussed above and illustrated in FIG. 7.

Similarly, each device of plurality of devices 104A-104E can be designated as a primary media distribution device 126 through similar algorithmic criteria as is used to select the primary clock device 124 and the primary health device 125. The primary media distribution device 126 is responsible for sending and receiving media data to each device within network 106, e.g., data relating to music, voice, or other forms of audio data or video data such that each device can produce audio playback 120. In one example, primary media distribution device 126 can receive an audio stream, video stream, or series of images, from, e.g., a peripheral device such as a smart phone or other media source, and then send, receive, transmit, or otherwise distribute that media data to the other devices of plurality of devices 104A-104E within network 106. As the same algorithmic criteria used to select the primary clock device 124 can be used to select the primary health device 125 and the primary media distribution device 126, it should be appreciated that each primary device can be embodied within a single device of plurality of devices 104A-104E. As will be discussed below, the interaction of each primary device, i.e., primary clock device 124, primary health device 125, and primary media distribution device 126, maintains a functioning ecosystem of devices. For example, the primary clock device 124 will ensure each device's clocks are synchronized within a predefined threshold so that the primary media distribution device 126 accurately sends and receives data packets with accurate time stamps between each device so that they produce audio playback 120 within space S in a synchronized fashion. Additionally, the primary health device 125 periodically checks the devices connected to the network to at least ensure that the primary clock device 124 is constantly connected to the network and available to maintain clock synchronization across media system 100.

In one example operation of media system 100, after each device of plurality of devices 104A-104E is initially powered on within space S, each device communicates with the other devices of the plurality directly or via router 102 during a discovery phase DP, as illustrated schematically in FIG. 3. During this discovery phase DP, each device will send and receive information relating to, for example, device characteristics 108 of each device connected to the network within space S. Each device, will then update a product list PL which includes information relating to all of the other devices connected within network 106, and stores each device's device characteristics 108 in the memory of each device as shown schematically in FIG. 4. As discussed above, each device can utilized an algorithm stored in memory and executable by a processor of each device, which determines, based on a set of rules or predefined instructions which device of plurality of devices 104A-104E will be selected or promoted to the role of primary clock device 124 (shown in FIG. 5). Additionally, using the same or different algorithmic criteria, media system 100 can designate or select a primary health device 125 (not shown) and a primary media distribution device 126 (not shown). In one example, the algorithm dictates that the primary clock device 124 be selected from the device of the plurality of devices 104A-104E that has the lowest assigned local IP address 110 (as assigned by the DHCP server/service within router 102). Alternatively or additionally, the algorithm can layer the preferences for selection of the primary clock device 124, for example, as the device that has a device power type 114 that indicates that it is a wall powered device, i.e., is connected to wall outlet 118 (shown in FIG. 1) and has the lowest IP address 110 of the devices that are wall outlet powered. Once the primary clock device 124 is selected, e.g., device 104A, an initial clock synchronization sequence ICS (not shown) is initiated. This sequence can take longer than the periodic synchronization cycles discussed herein in order to place each device on the same clock domain 160, e.g., have every clock synchronized to within a predetermined threshold. Each device can enter or exit a power-saving state 138 as needed within network 106; however, it is the responsibility of the primary clock device 124 to periodically exit power-saving state 138, if it was in power-saving state 138, at predetermined time interval 142. After the primary clock device 124, i.e., device 104A, exits power-saving state 138, device 104A begins a synchronization process with each secondary device 128B-128E, which correspond to devices 104B-104E of plurality of devices 104A-104E. The synchronization process involves sending a clock synchronization request 146 from the primary clock device 124 to each secondary device 128B-128E, and receiving an acknowledgment 148 from each of the secondary devices 128B-128. After each device exits the power-saving state 138 in response to the clock synchronization request 146, each secondary device 128B-128E enters a clock synchronization sequence 144 with the primary clock device 124 until the secondary clocks 132B-132E are in a synchronous state 156 (not shown) with the primary clock 130 of primary clock device 124. Once in the synchronous state 156 (not shown), each device can optionally resume the state it was in prior to the clock synchronization process, for example, each device can optionally reenter power-saving mode 138 or may continue the production of audio playback 120 in the operational state 140.

Once each device of plurality of secondary devices 128B-128E is synchronized within the predetermined threshold, each secondary clock 132 of each secondary device 128B-128E as well as primary clock 130 of primary clock device 124 are now on the same clock domain 160. In the event that the primary media distribution device 126 and the primary clock device 124 are not the same device, for example, where the primary media distribution device 126 is selected from the plurality of secondary devices 128B-128E, any locally acquired media data to be distributed from the primary media distribution device 126 to and among the plurality of devices 140A-104E will have local timestamp data 164 which will need to be converted to the synchronized timestamp data 166 of the clock domain 160 by the primary media distribution device 126. Additionally, every secondary device 128B-128E when receiving locally acquired media data having local time stamp data 164, can make adjustments to any local timestamp data 164 so that it conforms with the timestamp data of the clock domain 160, i.e., the synchronized timestamp data 166. Local timestamp data 164 can include packet timestamps 168 for each packet of data sent corresponding to media data sent and/or received by the primary media distribution device 126 as well as any time-offset required to convert the local timestamp data 164 to the synchronized timestamp data 166 for use among the devices within the clock domain 160.

Figure 8:
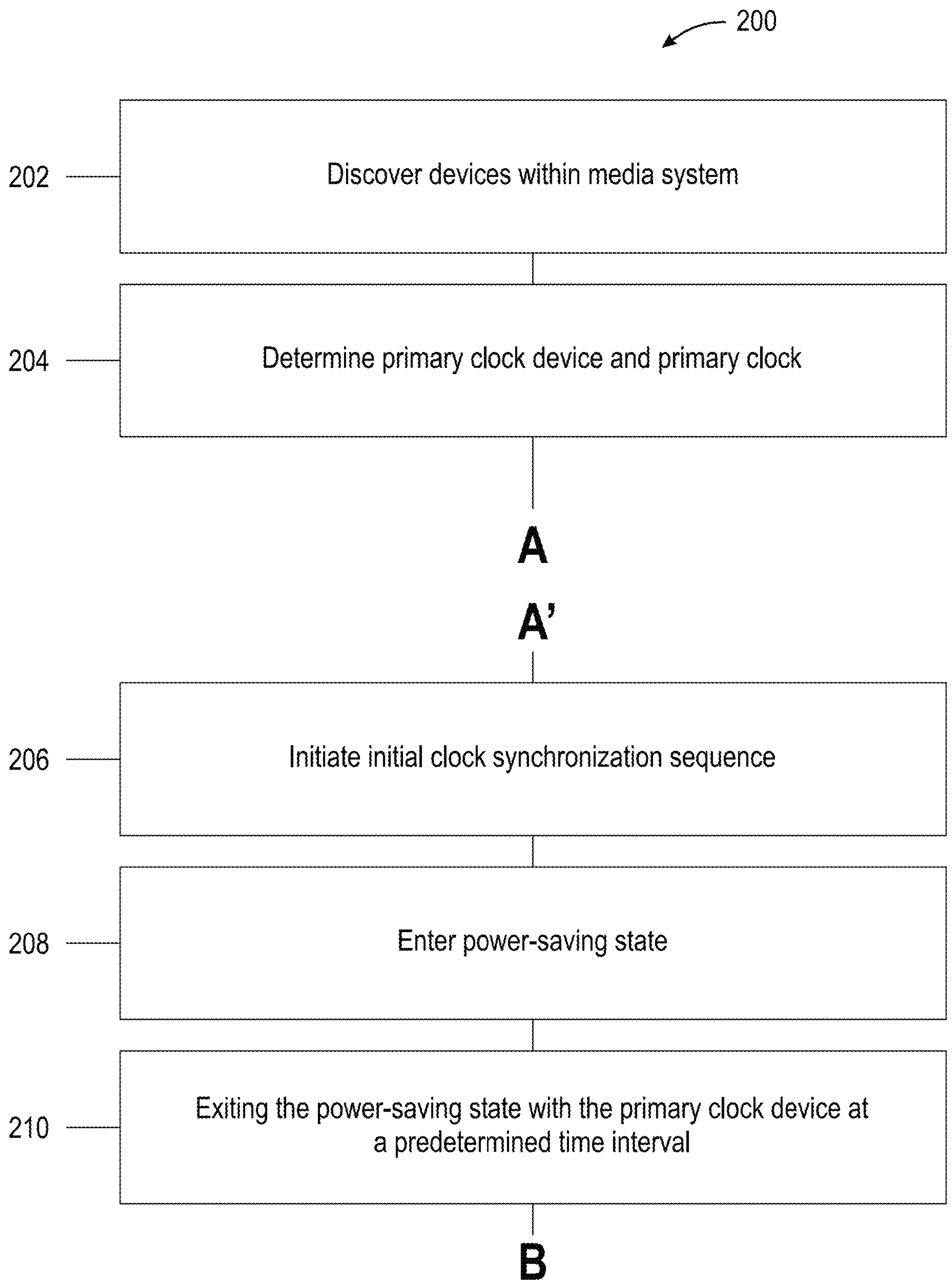
FIG. 8 is a flow chart illustrating the steps of a method according to the present disclosure.
Figure 9:
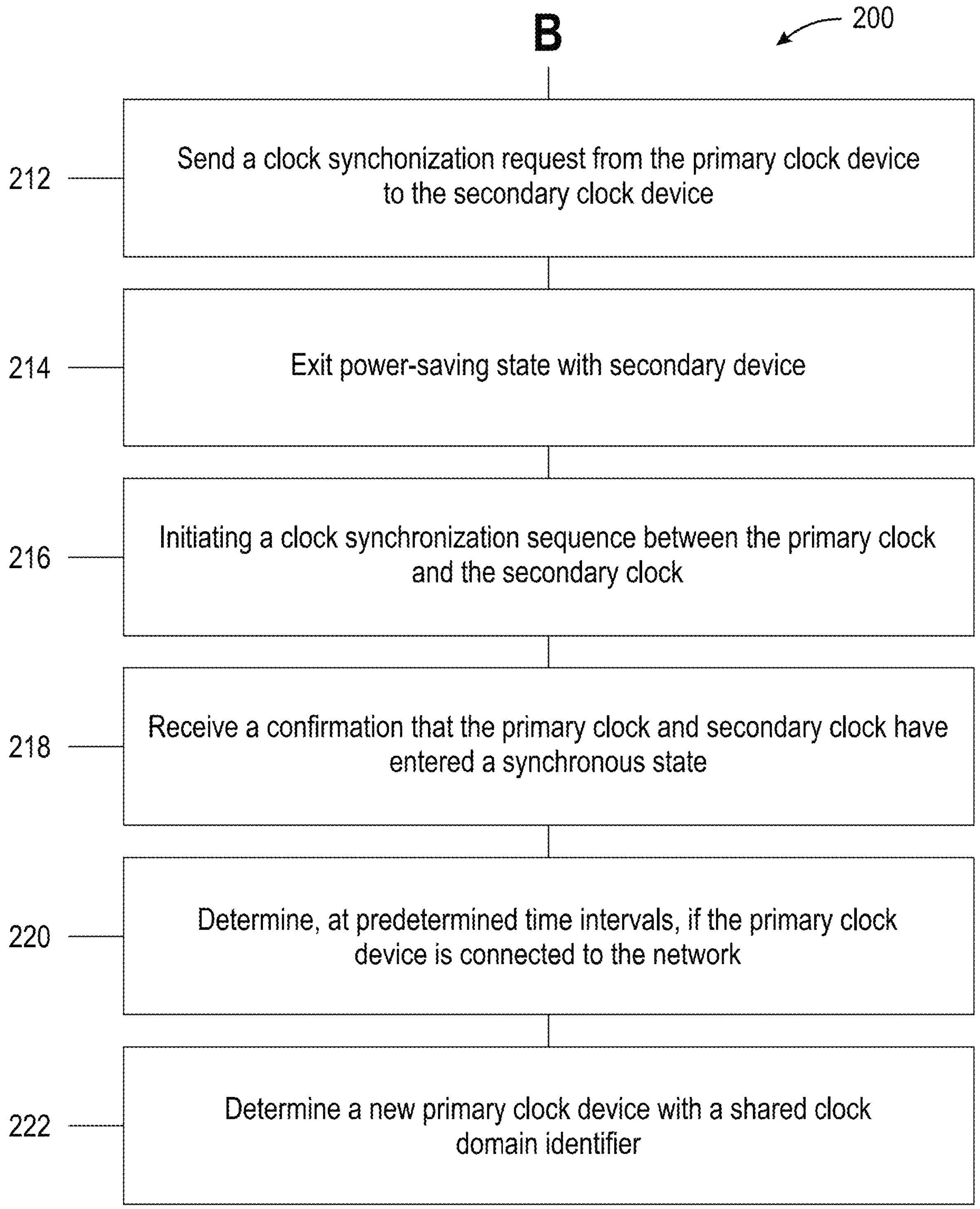
FIG. 9 is a flow chart illustrating the steps of a method according to the present disclosure.
Figure 10:
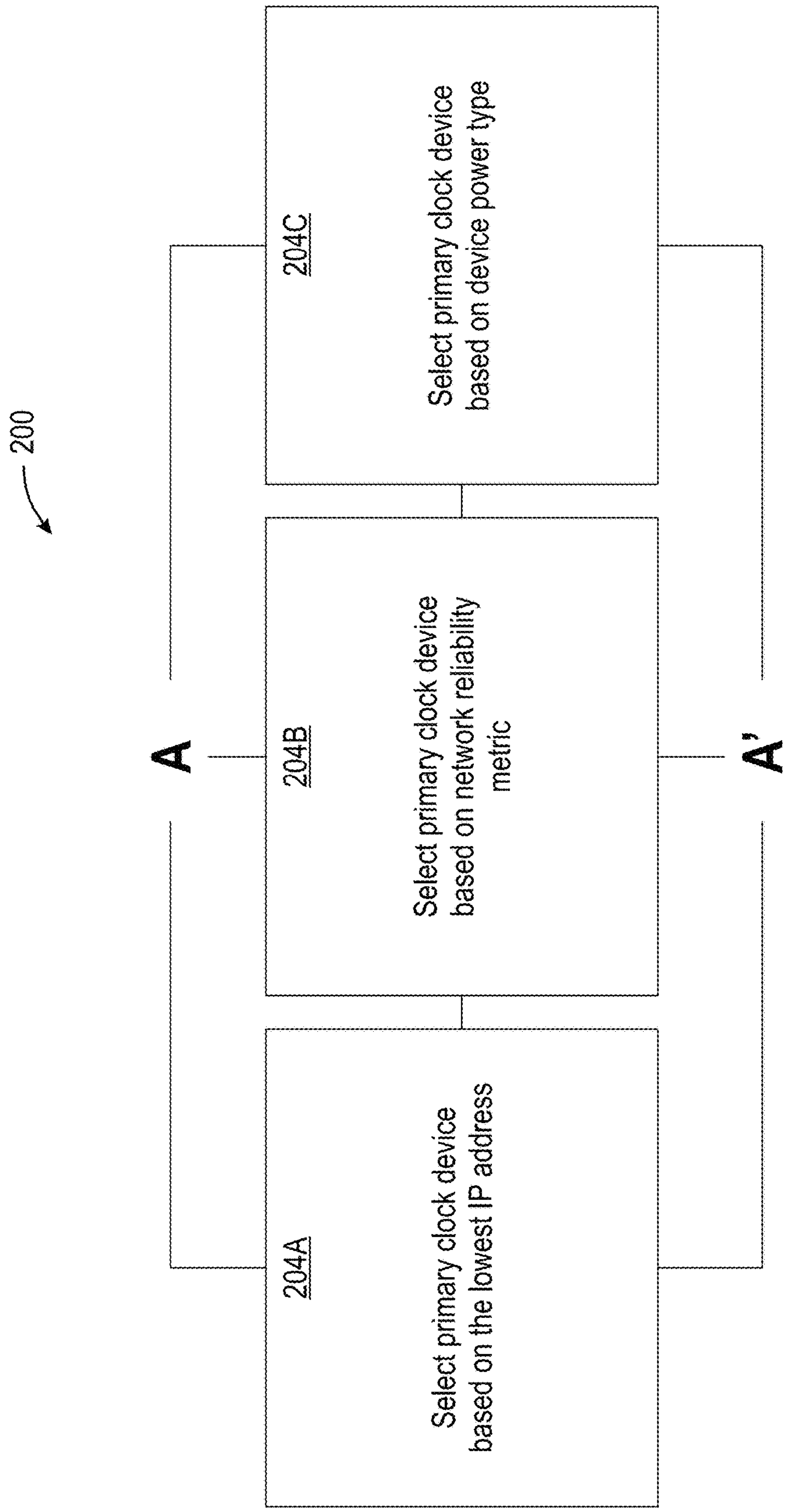
FIG. 10 is a flow chart illustrating the steps of a method according to the present disclosure.

FIGS. 8-10 include a flowchart illustrating the steps of method 200 as described herein. Method 200 includes, for example: discovering, over a network 106, a plurality of devices 104A-104E within a media system 100 (step 202); determining a primary clock device 124 of the plurality of devices 104A-104E, the primary clock device 124 having a primary clock 130 (step 204); selecting the primary clock device 124 from the plurality of devices 104A-104E, wherein the primary clock device 124 has a lowest IP address 110 of the plurality of devices 104A-104E (step 204A); selecting the primary clock device 124 from the plurality of devices 104A-104E based at least in part on the network reliability metric 112 of each device of the plurality of devices 104A-104E (step 204B); or selecting the primary clock device 124 from the plurality of devices 104A-104E, wherein the primary clock device 124 has a wall-powered device power type 114 (step 204C). Method 200 can further include, for example: initiating an initial clock synchronization sequence ICS between the primary clock device 124 and each at least one secondary device 128, wherein the initial clock synchronization sequence ICS is arranged to synchronize the secondary clock 132 of the secondary device 128 with the primary clock 130 (step 206); entering, with the primary clock device 124 and the secondary device 128 a power-saving state 138 (step 208); exiting, with the primary clock device 124 the power-saving state 138 at a predetermined time interval 142 (step 210); sending a clock synchronization request 146 from the primary clock device 124 to a secondary device 128 of the plurality of devices 104A-104E, regardless of whether media content is being rendered by any of the plurality of devices 104A-104E (step 212); exiting, with the secondary device 128, the power-saving state 138 upon receipt of the clock synchronization request 146 from the primary clock device 124 (step 214); initiating a clock synchronization sequence 144 wherein the clock synchronization sequence 144 is arranged to synchronize a secondary clock 132 of the secondary device 128 with the primary clock 130 of the primary clock device 124 (step 216); and receiving, at the primary clock device 124, a confirmation 154 that the secondary clock 132 and the primary clock 130 have entered a synchronous state 156 (not shown)(step 218). Once synchronized, method 200 can also include: determining, at predefined time intervals 143, if the primary clock device is connected to the network using, for example, a primary health device 125 (step 220); and determining a new primary clock device 158 from the plurality of devices 104A-104E connected to the network 106 where each device of the plurality of devices 104A-104E shares a clock domain identifier 160 if the primary clock device 124 is no longer connected to the network 106 (step 222).

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The above-described examples of the described subject matter can be implemented in any of numerous ways. For example, some aspects may be implemented using hardware, software or a combination thereof. When any aspect is implemented at least in part in software, the software code can be executed on any suitable processor or collection of processors, whether provided in a single device or computer or distributed among multiple devices/computers.

The present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

The computer readable program instructions may be provided to a processor of a, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which comprises one or more executable instructions for implementing the specified logical function (s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Other implementations are within the scope of the following claims and other claims to which the applicant may be entitled.

While various examples have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the examples described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific examples described herein. It is, therefore, to be understood that the foregoing examples are presented by way of example only and that, within the scope of the appended claims and equivalents thereto, examples may be practiced otherwise than as specifically described and claimed. Examples of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method for synchronizing clocks of a plurality of devices within a media system connected over a network, the method comprising:

discovering all devices of the plurality of devices within the media system;

selecting a primary device of the plurality of devices to coordinate clock synchronization for all other devices of the plurality of devices, the selecting of the primary device performed according to an algorithm;

at the primary device of the plurality of devices, periodically exiting a power-saving state and wirelessly transmitting a clock synchronization request from the primary device to a secondary device of the plurality of devices, the clock synchronization request configured to initiate a clock synchronization sequence and cause the secondary device to exit a power-saving state, the clock synchronization sequence configured to synchronize a clock of the secondary device with a clock of the primary device to within a predetermined threshold, wherein the secondary device is configured to wirelessly receive the clock synchronization request in the power-saving state; and after the clock synchronization sequence has been performed, reentering the power-saving state at the primary device and the secondary device.

2. The method of claim 1, wherein the clock synchronization sequence utilizes a clock synchronization protocol selected from: a Clock-sampling mutual network synchronization protocol (CS-MNS), a Network Time Protocol (NTP), a Precision Time Protocol (PTP), a Reference Broadcast Time Synchronization protocol (RBS), Synchronous Ethernet protocol, Data-Plane Time-Synchronization Protocol (DPTP), or any other protocol capable of sending, receiving and synchronizing two device clocks over a wired or wireless connection.

3. The method of claim 1, wherein the primary device reenters the power-saving state after the primary device receives confirmation that the secondary device has performed a predetermined number of cycles of the clock synchronization sequence.

4. The method of claim 1, wherein, once initiated, the clock synchronization sequence runs for a predetermined duration of time.

5. The method of claim 1, wherein the primary device reenters the power-saving state after the primary device receives confirmation that the clock of the secondary device is synchronized with the clock of the primary device to within the predetermined threshold.

6. The method of claim 1, wherein, in response to the clock of the secondary device not being synchronized with the clock of the primary device to within the predetermined threshold, the secondary device sends a negative confirmation to indicate the clock of the secondary device and the clock of the primary device are not in a synchronized state.

7. The method of claim 6, wherein, in response to the secondary device sending the negative confirmation, the primary device reinitiates the clock synchronization sequence with the secondary device.

8. The method of claim 1, wherein, in response to the primary device no longer being connected to the network, promoting a different device of the plurality of devices to operate as the primary device.

9. The method of claim 1, wherein the algorithm for the selecting of the primary device is based on at least one characteristic of the plurality of devices, wherein the at least one characteristic of the plurality of devices includes device power type.

10. The method of claim 1, wherein the algorithm for the selecting of the primary device is based on random or arbitrary selection.

11. A system for synchronizing clocks of a plurality of devices within a media system connected over a network, the system comprising:

a primary device of the plurality of devices; and a secondary device of the plurality of devices, wherein all devices of the plurality of devices are discovered within the media system prior to selecting the primary device, the primary device configured to coordinate clock synchronization for all other devices of the plurality of devices, the selecting of the primary device performed according to an algorithm, wherein the primary device is configured to periodically exit a power-saving state and wirelessly transmit a clock synchronization request to the secondary device, the clock synchronization request configured to initiate a clock synchronization sequence and cause the secondary device to exit a power-saving state, the clock synchronization sequence configured to synchronize a clock of the secondary device with a clock of the primary device to within a predetermined threshold, wherein the secondary device is configured to wirelessly receive the clock synchronization request in the power-saving state, and wherein after the clock synchronization sequence has been performed, the primary device and the secondary device are configured to reenter the power-saving state.

12. The system of claim 11, wherein the clock synchronization sequence utilizes a clock synchronization protocol selected from: a Clock-sampling mutual network synchronization protocol (CS-MNS), a Network Time Protocol (NTP), a Precision Time Protocol (PTP), a Reference Broadcast Time Synchronization protocol (RBS), Synchronous Ethernet protocol, Data-Plane Time-Synchronization Protocol (DPTP), or any other protocol capable of sending, receiving and synchronizing two device clocks over a wired or wireless connection.

13. The system of claim 11, wherein the primary device reenters the power-saving state after the primary device receives confirmation that the secondary device has performed a predetermined number of cycles of the clock synchronization sequence.

14. The system of claim 11, wherein, once initiated, the clock synchronization sequence runs for a predetermined duration of time.

15. The system of claim 11, wherein the primary device reenters the power-saving state after the primary device receives confirmation that the clock of the secondary device is synchronized with the clock of the primary device to within the predetermined threshold.

16. The system of claim 11, wherein, in response to the clock of the secondary device not being synchronized with the clock of the primary device to within the predetermined threshold, the secondary device sends a negative confirmation to indicate the clock of the secondary device and the clock of the primary device are not in a synchronized state.

17. The system of claim 16, wherein, in response to the secondary device sending the negative confirmation, the primary device reinitiates the clock synchronization sequence with the secondary device.

18. The system of claim 11, wherein, in response to the primary device no longer being connected to the network, promoting a different device of the plurality of devices to operate as the primary device.

19. The system of claim 11, wherein the algorithm for the selecting of the primary device is based on at least one characteristic of the plurality of devices, wherein the at least one characteristic of the plurality of devices includes device power type.

20. The system of claim 11, wherein the algorithm for the selecting of the primary device is based on random or arbitrary selection.

* * * * *